United States Patent [19]

Barua et al.

[11] 4,171,418
[45] * Oct. 16, 1979

[54] CATIONIC AND AMPHOTERIC SURFACTANTS

[75] Inventors: Girish C. Barua, New Canaan; Daniel E. Nagy, Stamford, both of Conn.

[73] Assignee: American Cyanamid Company, Stamford, Conn.

[*] Notice: The portion of the term of this patent subsequent to Jul. 4, 1995, has been disclaimed.

[21] Appl. No.: 853,976

[22] Filed: Nov. 22, 1977

[51] Int. Cl.$^2$ .................. C08F 220/56; C08F 220/58; C08F 228/00; C08F 220/02
[52] U.S. Cl. ............................ 526/287; 260/29.6 TA; 526/212; 526/229; 526/292; 526/303; 526/304; 526/923
[58] Field of Search ............... 526/292, 304, 303, 923, 526/287; 260/79.3 MU

[56] References Cited

U.S. PATENT DOCUMENTS

| | | | |
|---|---|---|---|
| 2,909,508 | 10/1959 | Jones | 260/79.3 MU |
| 2,978,432 | 4/1961 | Graulich et al. | 526/23 |
| 3,117,108 | 1/1964 | Calvete | 526/304 |
| 3,312,671 | 4/1967 | Swisher | 260/79.3 MU |
| 3,336,270 | 8/1967 | Monagle | 260/79.3 MU |
| 3,340,238 | 9/1967 | Smith et al. | 260/79.3 MU |
| 3,509,113 | 4/1970 | Monagle et al. | 260/79.3 MU |
| 3,551,525 | 12/1970 | Wilhelm et al. | 526/304 |
| 3,692,673 | 9/1972 | Hoke | 260/79.3 MU |
| 3,799,910 | 3/1974 | Shingai et al. | 526/304 |
| 3,821,175 | 6/1974 | Daniels et al. | 526/304 |

*Primary Examiner*—Herbert J. Lilling
*Attorney, Agent, or Firm*—Gordon L. Hart

[57] ABSTRACT

Novel water-soluble acrylamide copolymers contain 40 to 70 percent by weight acrylamide units, at least 30 percent of hydrophobic vinyl units and at least 10 percent of vinyl units having ionic properties. In aqueous solution these copolymers have the properties of cationic or amphoteric surface active agents.

11 Claims, No Drawings

CATIONIC AND AMPHOTERIC SURFACTANTS

The invention relates to improvements in water-soluble vinyl addition copolymers having surface active properties in aqueous solutions.

In our copending U.S. pat. application Ser. No. 705,315, filed July 14, 1976, we described novel, water-soluble vinyl addition copolymers having 40 to 70 percent by weight of acrylamide units and from 30 to 60 percent by weight, of other selected vinyl monomer units in the copolymer. Copolymers having molecular weights in the range from about 800 to about 10,000 were described, which had been prepared by vinyl addition polymerization in a solution of about 40 to 70 percent by weight acrylamide monomer and about 30 to 60 percent by weight of at least one comonomer which ordinarily would lend hydrophobic properties to the polymer, e.g. isobutoxymethylacrylamide, butylacrylate and t-butylacrylamide. The presence of the latter comonomers in such high concentration in the copolymer would have been expected to render the copolymers insoluble in water, but it was found that at least the low molecular weight copolymers of this description would be water-soluble and further it was found that water-soluble copolymers of the kind described would have nonionic surface active properties in aqueous solutions.

According to the present invention, we produce water-soluble copolymers useful as surfactants and having cationic or amphoteric properties in aqueous solutions. Those are copolymers of acrylamide and from about 30 to 70 weight percent of other vinyl comonomers which include selected comonomers having ionic properties. The present copolymers differ from those described in our earlier application by the fact that the vinyl comonomer units in the copolymer comprise units of at least one vinyl comonomer having a cationic group in the molecule and may also comprise units of a monomer having an anionic group in the molecule.

By including ionic comonomers having only cationic groups we produce surface active copolymers having cationic properties in aqueous solution, i.e. cationic surfactants. By using comonomers having both cationic and anionic groups, in approximately equivalent ionic amounts, we produce surface active copolymers having amphoteric properties in aqueous solution.

In the copolymers according to the invention we still employ acrylamide as an essential component, constituting from about 40 to about 60 percent by weight of the polymeric molecule. Also, we include not less than about 30 percent by weight of at least one other vinyl comonomer which is non-ionic and which ordinarily would have hydrophobic properties in the polymer, e.g. a vinyl monomer such as isobutoxymethyl acrylamide, butylacrylate and t-butylacrylamide. Additionally, in the copolymerization mixture we include from about 10 to about 30 weight percent of a vinyl comonomer that will provide cationic radicals in the copolymer molecule. Specific examples of cationic vinyl compounds useful for this purpose include vinyl compounds having a quarternary amino group, e.g. dimethylaminopropyl methacrylamide, methacrylamidopropyl triethylammonium chloride, dimethylaminoethyl methacrylate, diethylaminoethyl methacrylate, and the like. For making an amphoteric copolymer we also include, in addition to the acrylamide and the non-ionic and the cationic comonomers, as described above, still another monomer that will provide an anionic moiety in the polymer molecule, for example a vinyl acid such as acrylic acid, methacrylic acid, itaconic, maleic, fumaric acids, 2-sulfoethylmethacrylate, and 2-acrylamide-2-methyl propane sulfonic acid.

In our most preferred embodiments, the anionic comonomer is used in amount with relation to the cationic comonomer which will provide approximately equivalent ionic amounts of cationic and anionic groups in the molecule.

The monomers are mixed and polymerized by solution polymerization in aqueous medium which also will include another polar cosolvent as a chain transfer agent under conditions regulated to produce a water-soluble copolymer which usually will fall in the molecular weight range from 800 to 10,000. To regulate the product molecular weight we may use isopropanol or other chain transfer agent, preferably a low-boiling polar cosolvent in an amount selected to yield a low molecular weight polymer product. We may use any of the conventional free-radical initiator systems to carry out the polymerization in relatively higher amounts selected to yield lower molecular weight polymer products. We prefer to use metabisulfite-persulfate system, but instead may use hydrogen peroxide, organic peroxides or azo-compounds as initiators.

To obtain a water-soluble copolymer product, the reaction is carried out at reflux temperature, usually about 70° to 90° C. and the pH is maintained in a mildly acid range, preferably about pH4 to pH5 or is buffered by addition of sodium bicarbonate. Reaction time usually will be in a range from about 20 to about 60 minutes at reflux. The water-soluble copolymer products have average molecular weights in the range from about 800 to about 10,000. The measured molecular weight of these polymers were determined by gel permeation chromatography (gpc), using a column calibrated with polyethylene glycols of known molecular weights. As in most methods used for measuring the molecular weight of polymers, a value obtained by this method is an approximation of an actual average molecular weight value.

EXAMPLE 1

Cationic polymeric surfactant
40/50/10-Isobutoxymethyl-acrylamide
(IBMA)/acrylamide (AMD)/methacrylamidopropyl
triethylammonium chloride (MAPTAC)

A solution of 40 g isobutoxymethylacrylamide (IBMA), 50g acrylamide (AMD) and 20.8 g of a 48 percent solution of methyacrylamidopropyl triethylammonium chloride (MAPTAC) in 300 ml of isopropyl alcohol and 225 ml of water is heated to 60° C. Solutions of sodium metabisulfite and ammonium persulfate (2.5 g each in 10 ml of water) are added and the resulting exothermic reaction is controlled by a cooling bath as needed. After the exotherm has ceased, heating is supplied to keep the reaction mixture at reflux temperature (83° C.) and a 10 percent aqueous solution of sodium hydroxide is added as required to keep the reaction at pH 4-5. After 30 min. at reflux, the reaction mixture is cooled and adjusted to pH 7.0. Isopropyl alcohol is removed under reduced pressure to yield a 35 percent aqueous solution of soluble polymer. The copolymer product has a measured average molecular weight of 2700 (by gpc) and a surface tension of 34 dynes/cm as a 1.0 percent aqueous solution. In aqueous solution the polymer has cationic properties.

EXAMPLE 2

Amphoteric polymeric surfactant 40/47/10/3-Isobutoxymethyl-acrylamide (IBMA)/acrylamide (AMD)/trimethylamino propylacrylamide (MAPTAC)/acrylic acid (AA)

Amphoteric polymeric surfactant is prepared by a procedure like that described in Example 1 except using an additional comonomer which will provide anionic units in the polymer molecule. A solution of 40 g IBMA, 47 g AMD, 20.8 g of 48 percent solution of MAPTAC, and 3 g of acrylic acid in 300 ml of isopropyl alcohol and 225 ml of water is heated to 70° C. Polymerization is initiated by the addition of sodium metabisulfite and ammonium persulfate (2.5 g each in 10 ml of water). The exothermic reaction is controlled by use of a cooling bath and the pH is kept in a range about 4 to 5 by the addition of 10 percent aqueous solution of sodium hydroxide as needed. When the exotherm has subsided, heat is applied as needed to maintain reaction under reflux conditions at the reflux temperature (83° C.). After 30 min. at reflux, the pH is adjusted to 7.0 and the isopropyl alcohol is evaporated under reduced pressure to give a 35 percent aqueous solution of the polymer product. The resulting polymer had an average molecular weight of 2800 (by gpc) and a surface tension of 35 dynes/cm as a 1.0 percent aqueous solution.

EXAMPLE 3

Isobutoxymethylacrylamide (IBMA)/acrylamide (AMD)/dimethylaminopropyl methacrylamide (DMAPMA)

A solution of 80 g IBMA, 100 g AMD, and 20 g dimethylaminopropyl methacrylamide (DMAPMA) in 600 ml of isopropyl alcohol and 450 ml of water is heated to 60° C. Sodium bicarbonate (3.5 g) is added to buffer the pH followed by solutions of sodium metabisulfite and ammonium persulfate (each 5.0 g in 15 ml of water). The resulting exothermic reaction is controlled by a cooling bath as needed. After the exotherm has ceased, heating is applied to keep the reaction mixture at reflux temperature (83° C.) for 30 minute after which isopropanol is distilled off until the reaction temperature has reached 90° C. Water is removed by evaporation under reduced pressure to give a 45-50% solution of polymer. The reaction mixture is cooled and adjusted to pH7. The material obtained has an average molecular weight of 7,000 and a surface tension of 35 dynes/cm as a 1.0% aqueous solution.

EXAMPLE 4

Isobutoxymethylacrylamide (IBMA)/acrylamide (AMD)/diethylaminoethyl methacrylate (DEAEMA)/2-acrylamido-2-methylpropanesulfonic acid (AMPS)

The polymer is prepared by the procedure described in Example 3, using the following amounts of reagents: IBMA, 80 g; AMD, 100 g; diethylaminoethyl methacrylate (DEAEMA), 20 g; 2-acrylamido-2-methylpropanesulfonic acid (AMPS), 22.4 g; the other reagents and amounts are the same as in Example 3. The polymer obtained has an average molecular weight of 3,000 and surface tension of 36 dynes/cm as a 1.0% aqueous solution.

EXAMPLE 5

Additional cationic and amphoteric copolymers were made by processes like those described in the foregoing examples except with variations in the ratios of monomers in the several syntheses and variations of the molecular weights of the copolymers within the defined range. In Tables 1 and 2 the monomers used for making the individual copolymers and the ratios by weight of the monomers are shown with the measured molecular weight range and the average molecular weight (gpc) of each polymer and the measured surface tension of a 1% by wt aqueous solution of each polymer. Cationic copolymers are listed in Table I, and amphoteric copolymers are listed in Table II.

TABLE I

| CATIONIC COPOLYMERS | | | |
|---|---|---|---|
| Monomer Ratio | MW Range | Average | Surface Tension % Solution |
| 40/50/10 IBMA/AMD/MAPTAC | 1,000–10,000 | 7,000 | 34 |
| 40/50/10 IBMA/AMD/MAPTAC | 3,000–11,000 | 9,000 | 33 |
| 40/30/30 IBMA/AMD/MAPTAC | 1,000–6,000 | 3,000 | 31 |
| 40/50/10 IBMA/AMD/DMAPMA | 2,000–10,000 | 7,000 | 35 |
| 40/50/10 IBMA/AMD/DMAEMA | 1,000–9,000 | 6,000 | 32 |
| 40/50/10 IBMA/AMD/DEAEMA | 1,000–6,000 | 3,000 | 33 |

IBMA = isobutoxymethylacrylamide
AMD = acrylamide
MAPTAC = methacrylamidopropyltrimethylammonium chloride
DMAPMA = dimethylaminopropyl methacrylamide
DMAEMA = dimethylaminoethyl methacrylate
DEAEMA = diethylaminoethyl methacrylate

TABLE II

| AMPHOTERIC POLYMERS | | | |
|---|---|---|---|
| Monomer Ratio | MW Range | Average | Surface Tension % Solution |
| 40/50/10/3.3 IBMA/AMD/MAPTAC/AA | 3,000–15,000 | 9,000 | 36 |
| 40/30/30/8.8 IBMA/AMD/MAPTAC/IA | 300–3,000 | 1,100 | 35 |
| 40/50/10/5.1 IBMA/AMD/DMAPMA/M | 1,500–15,000 | 9,000 | 35 |
| 40/50/10/8.3 IBMA/AMD/DMAEMA/SVS | 3,000–15,000 | 9,000 | 37 |

TABLE II-continued
AMPHOTERIC POLYMERS

| Monomer Ratio | MW Range | Average | Surface Tension % Solution |
|---|---|---|---|
| 40/50/10/11.2 IBMA/AMD/DEAEMA/AMPS | 500-10,000 | 1,800 | 36 |

AA = acrylic acid
IA = itaconic acid
MA = methacrylic acid
SVS = sodium vinyl sulfonate
AMPS = 2-acrylamido-2-methylpropanesulfonic acid

We claim:

1. A water-soluble vinyl addition copolymer consisting of copolymerized vinyl monomeric units of which 30 to 70 percent by weight consist of acrylamide units, at least 30 percent by weight consist of at least one nonionic vinyl monomer unit having hydrophobic properties and at least 10 percent by weight consist of vinyl monomer units having ionic properties in aqueous solution, said copolymer having surface active properties in aqueous solution.

2. A water-soluble copolymer defined by claim 1 wherein all of said vinyl monomer units having ionic properties are cationic units.

3. A water-soluble copolymer defined by claim 1 wherein those vinyl monomeric units having ionic properties in the polymer molecule consist of equivalent ionic proportions of cationic and anionic units to provide a copolymer having amphoteric ionic properties in aqueuos solution.

4. A water-soluble copolymer defined by claim 1 wherein said nonionic units having hydrophobic properties are addition polymerized units of nonionic monomers selected from isobutoxymethyl acrylamide, butylacrylate and t-butylacrylamide.

5. A water-soluble copolymer defined by claim 4 wherein the defined nonionic monomer is isobutoxymethyl acrylamide.

6. A water-soluble copolymer defined by claim 1 wherein the defined vinyl monomer units having ionic properties consist of copolymerized units of at least one monomer selected from dimethylaminoethyl methacrylate, dimethylaminopropyl methacrylamide, diethylaminoethyl methacrylate and methacrylamidopropyl trimethyl-ammonium chloride.

7. A water-soluble copolymer defined by claim 1 wherein the defined vinyl monomer units having ionic properties consist of copolymerized units of ionic equivalent amounts of at least one cationic monomer selected from methacrylamidopropyl triethylammonium chloride, diethylamino ethyl methacrylate, dimethylaminoethyl methacrylate, dimethylaminopropyl methacrylamide and at least one anionic monomer selected from vinyl acids, their salts and ionizable esters.

8. A water-soluble copolymer defined by claim 5 wherein the ionizable monomer units are copolymerized units of methacrylamidopropyl trimethylamino chloride.

9. A water-soluble copolymer defined by claim 5 wherein the defined ionizable monomer units consist of ionic equivalent amounts of copolymerized methacrylamidopropyl triethylamino chloride and a vinyl acid or a salt or ionizable ester thereof.

10. A water-soluble copolymer defined by claim 9 wherein the vinyl acid is selected from the group consisting of acrylic acid, itaconic acid, methacrylic acid, sodium vinyl sulfonate and 2-acrylamido-2-methylpropanesulfonic acid.

11. A water-soluble copolymer defined by claim 7 wherein the anionic monomers are selected from the group consisting of acrylic acid, itaconic acid, methacrylic acid, sodium vinyl sulfonate and 2-acrylamido-2-methylpropane sulfonic acid.

* * * * *